UNITED STATES PATENT OFFICE.

FRANCIS W. HIGGINS, OF NIAGARA FALLS, NEW YORK, ASSIGNOR TO THE CARBORUNDUM COMPANY, OF NIAGARA FALLS, NEW YORK, A CORPORATION OF PENNSYLVANIA.

PROCESS OF PURIFYING ELECTROMETALLURGICAL PRODUCTS.

966,399.  Specification of Letters Patent.  Patented Aug. 2, 1910.

No Drawing.   Application filed February 28, 1907.  Serial No. 359,935.

*To all whom it may concern:*

Be it known that I, FRANCIS W. HIGGINS, of Niagara Falls, Niagara county, New York, have invented a new and useful Process of Purifying Electrometallurgical Products, of which the following is a full, clear, and exact description.

My invention relates to the purification of chemically inert electrometallurgical products, such as the carbids of silicon, boron, titanium, and like compounds, which are not affected by treatment at ordinary temperatures with chemical reagents. The raw materials from which such products are produced on a commercial scale, contain undesirable elements such as iron, aluminum, calcium, etc., and although a large proportion of such elements are removed by volatilization at the temperatures at which these products are formed, yet this removal is seldom so complete but what small percentages of such impurities cling to the substance being produced, in the form of carbids, silicids, borids, etc. Furthermore, any or all of the elements which should be chemically combined to form the product desired, may, on account of improper admixture of the raw materials or by reason of conditions arising in the electric furnace, remain uncombined as free elements on the product. These free elements, in many cases, may in themselves constitute an impurity which will impair the efficiency of the product. I have discovered that impurities of either or both these classes may be removed from such electrometallurgical products by digesting the material or product in a bath containing hydrofluoric acid and an oxidizing agent. The hydrofluoric acid is preferably used as an aqueous solution, and the oxidizing agent may be permanganate of potash, bichromate of potash, nitrate of soda, chlorate of potash, etc. With certain oxidizing agents, it is advantageous, also, to have present another acid, to facilitate the action of said oxidizing agent; for example, sulfuric acid for permanganate of potash or nitrate of soda, hydrochloric acid for the chlorate or bichromate of potash, etc.

I have found this process especially useful in treating carborundum, where it is desired to remove the impurities from the surfaces of the grains after crushing. The chief impurities, in this case, are free silicon, and iron and aluminum in the form of carbids and silicids; and the preferred process in this case consists in placing the crushed carborundum in a bath composed of aqueous solutions of sulfuric and hydrofluoric acids and permanganate of potash or other oxidizing agent, and digesting for several hours at a temperature of 150 to 200 degrees Fahrenheit. The materials composing the bath are preferably used in a quantity sufficient to combine with all the impurities to be removed. The effect of the bath is to completely dissolve and remove the free silicon and all basic carbids and silicids which may be exposed on the surfaces of the grains.

The process may be applied to many other non-metallic electrically produced products which do not react with acids, especially products which are made for abrasive purposes, and changes may be made in the oxidizing agent or agents employed. Other acids may be used or not, as desired, with the hydrofluoric acid.

I claim:—

1. The process of removing silicon-containing impurities from non-metallic, non-acid re-acting electrometallurgical products which consists of treating said products with a solution containing nitric, sulfuric and hydrofluoric acids, causing the nitric acid to oxidize the silicon of said impurities to silicon oxid, and concurrently causing the hydrofluoric acid to dissolve the silicon oxid.

2. The process of removing silicon-containing impurities from non-metallic, non-acid re-acting electrometallurgical products which consists of treating said products with a solution containing an oxidizing salt, and sulfuric acid, causing the oxidation of the silicon-containing impurities to silicon oxid, and concurrently causing hydrofluoric acid to dissolve the silicon oxid.

3. The process of removing silicon-containing impurities from carborundum which consists of treating said products with a solution containing nitric, sulfuric and hydrofluoric acids, causing the nitric acid to oxidize the silicon of said impurities to silicon oxid, and concurrently causing the hydrofluoric acid to dissolve the silicon oxid.

4. The process of removing silicon-containing impurities from carborundum which consists of treating said products with a solution containing an oxidizing salt, and sulfuric acid, causing the oxidation of the silicon-containing impurities to silicon oxid, and concurrently causing hydrofluoric acid to dissolve the silicon oxid.

5. The process of removing silicon-containing impurities from inert electrical metallurgical products, consisting in treating said products with a bath containing sulfuric and hydrofluoric acids and an oxidizing agent.

6. The process of removing silicon-containing impurities from inert electrical metallurgical products, consisting in treating said product with a bath containing hydrofluoric acid and an oxidizing agent.

In testimony whereof, I have hereunto set my hand.

FRANCIS W. HIGGINS.

Witnesses:
F. J. TONE,
ASHMEAD G. RODGERS.